L. S. MUNROE.
POTATO-BUG CATCHERS.

No. 195,835. Patented Oct. 2, 1877.

Witnesses
E. C. Perkins.
W. J. Pratt.

Inventor.
Luther S. Munroe
by Crosby & Gregory
Attys

UNITED STATES PATENT OFFICE.

LUTHER S. MUNROE, OF LYNNFIELD, MASSACHUSETTS.

IMPROVEMENT IN POTATO-BUG CATCHERS.

Specification forming part of Letters Patent No. 195,835, dated October 2, 1877; application filed July 30, 1877.

*To all whom it may concern:*

Be it known that I, LUTHER S. MUNROE, of Lynnfield, in the county of Essex and State of Massachusetts, have invented an Improved Potato-Bug Catcher, of which the following is a specification:

This invention relates to an apparatus to collect, so as to destroy, potato-bugs; and consists in a receptacle for the bugs, the receptacle having a D-handle made adjustable toward or from the central portion of the receptacle, in order that a person collecting the bugs need not stoop low, and may easily retain and move the receptacle before him.

The receptacle is also shaped to fit the ground about the potato-plants, whether the potatoes are planted in hills or rows.

Figure 1:
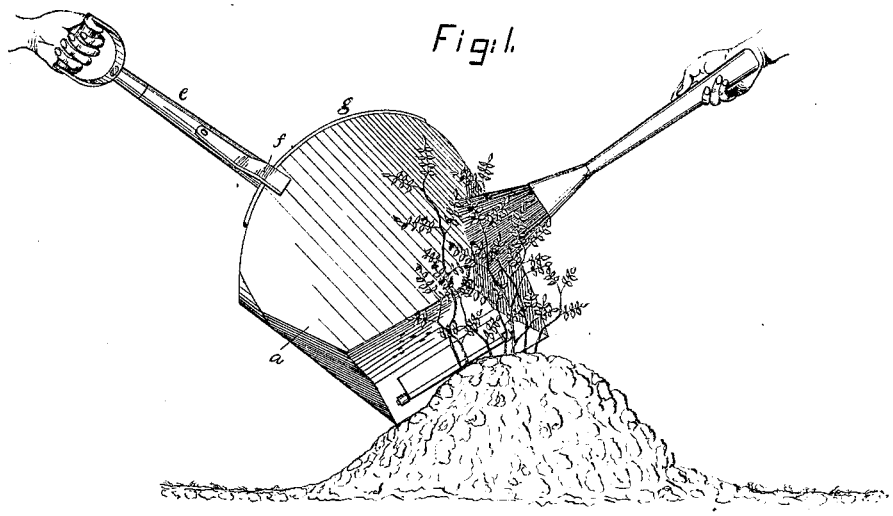
Figure 2:
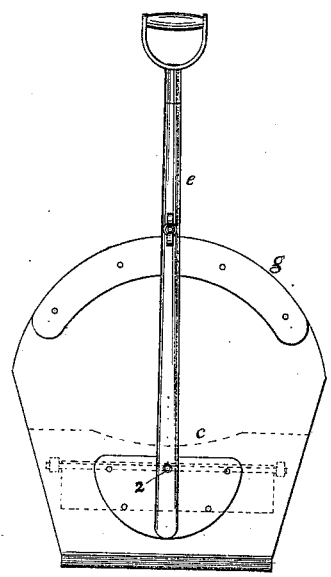
Figure 3:
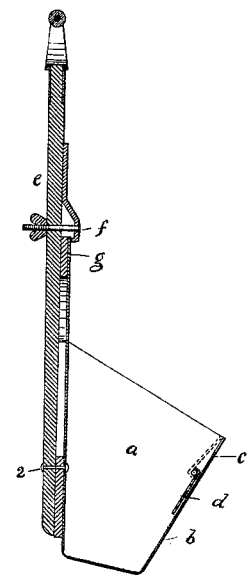

Figure 1 represents, in perspective, one of my improved devices as applied in position at one side of a hill of potatoes preparatory to sweeping or throwing the bugs therein; Fig. 2, a back view of the receptacle with the handle in vertical position; and Fig. 3 is a longitudinal section.

The receptacle $a$, of proper size to hold a peck or more of potato-bugs, is made of tin or sheet-iron, is open at top, and has its sides beveled toward the bottom of the receptacle.

The receptacle, when employed to collect, so as to destroy, bugs on potatoes planted in hills, has its front side $b$ cut away, as at $c$, (see dotted lines, Fig. 2,) so as to fit the rounded portions of the hills closely, and extend partially around the plant.

If the potatoes are planted in rows, the front side of this receptacle is provided with a hinged portion, $d$, adapted to be turned out, so as to make the front edge of the receptacle straight, or so as to rest on the ground heaped up as for potato-rows.

The handle $e$ of the receptacle is shown as a D-handle, of usual length, such handle being sufficiently long to permit the person collecting the bugs to place the receptacle in position on the ground under the vines without painfully bending the back.

This handle is pivoted at its lower end to the receptacle $a$, and is provided with a fastening device, $f$, composed, in this instance, of a finger and a screw, arranged to engage the upper curved back portion $g$ of the receptacle, so as to incline the D-handle forward or backward from the position shown in Fig. 2, so that the receptacle may be held by the right or left hand, or be moved in advance of the person, whether operating on the right or left hand sides of the rows of hills.

The inclination of the handle will also be made more or less according to the height of the person.

When placed with the front edge of the receptacle on the ground near the potato-vines, the bugs are swept or thrown from the vines and the ground, by a little broom or brush, into the receptacle, and when filled the bugs are removed and destroyed.

By this device bugs may be quickly and easily collected, with but little fatigue to the person, and without injury to the vines.

The back portion of the receptacle is extended sufficiently high to receive against it all bugs, insects, worms, &c., knocked from the vines in the direction of the receptacle, such bugs, &c., falling down to the bottom thereof.

The fastening device, instead of engaging the upper edge of the back of the receptacle, may be composed of a bolt, which may be made to extend through any one of a series of holes made through the back of the receptacle, such bolt also extending through the handle.

This apparatus may be used on all vines, to free them from bugs, worms, &c., as tomato-vines, &c.

I claim—

1. The receptacle $a$, provided with a high back portion, in combination with the laterally-adjustable handle and fastening device, to operate substantially as described.

2. The receptacle $a$, provided with a curved front edge, $c$, and with a hinged portion, $d$, arranged to operate all substantially as described.

3. The receptacle provided with a high back, in combination with the pivoted adjustable handle, made movable in the direction of the length of the receptacle, and with a fastening device, to operate substantially as described.

In testimony whereof I have signed my name to this specification in the presence of two subscribing witnesses.

LUTHER S. MUNROE.

Witnesses:
G. W. GREGORY,
W. J. PRATT.